(12) United States Patent
Dux et al.

(10) Patent No.: US 9,560,806 B2
(45) Date of Patent: Feb. 7, 2017

(54) CONTROL OF CONVEYOR SPEED IN A BALE GATHERING APPARATUS

(71) Applicant: Forage Innovations B.V., Maassluis (NL)

(72) Inventors: Darin Dux, Pella, IA (US); Kent Thompson, Otley, IA (US); Curt Graham, Lynnville, IA (US)

(73) Assignee: Forage Innovations B.V., Maassluis (NL)

( * ) Notice: Subject to any disclaimer, the term of this patent is extended or adjusted under 35 U.S.C. 154(b) by 363 days.

(21) Appl. No.: 13/918,293

(22) Filed: Jun. 14, 2013

(65) Prior Publication Data

US 2014/0003888 A1     Jan. 2, 2014

Related U.S. Application Data

(60) Provisional application No. 61/665,754, filed on Jun. 28, 2012.

(51) Int. Cl.
   *A01D 90/08*        (2006.01)

(52) U.S. Cl.
   CPC .................................. *A01D 90/083* (2013.01)

(58) Field of Classification Search
   CPC .... A01D 90/083; A01D 89/00; A01D 89/001; A01D 89/003; A01D 89/005; A01D 87/00; A01D 87/02; A01D 87/126; A01D 90/02; A01D 90/00
   USPC 414/24.5, 111, 812, 499, 505, 528; 198/520
   See application file for complete search history.

(56) References Cited

U.S. PATENT DOCUMENTS

| 3,412,840 | A | * | 11/1968 | Laikam ...................... 198/308.1 |
| 3,679,081 | A | | 7/1972 | Duncan, Jr. |
| 3,966,063 | A | | 6/1976 | Campbell et al. |
| 3,998,344 | A | * | 12/1976 | Pellen ........................... 414/503 |
| 4,081,094 | A | * | 3/1978 | Pereira ...................... B60P 1/38 |
| | | | | 198/310 |
| 4,176,511 | A | * | 12/1979 | Scudder ................. A01D 46/28 |
| | | | | 198/626.6 |
| 4,205,508 | A | | 6/1980 | Long |
| 4,248,561 | A | | 2/1981 | Graves |
| 4,419,042 | A | * | 12/1983 | Reed ...................... B60P 1/6454 |
| | | | | 100/218 |
| 4,430,846 | A | | 2/1984 | Presley et al. |
| 4,441,848 | A | * | 4/1984 | Bailey ...................... B60P 1/38 |
| | | | | 414/439 |
| 4,597,301 | A | | 7/1986 | Weis et al. |
| 4,637,547 | A | | 1/1987 | Hiniker et al. |
| 4,702,065 | A | * | 10/1987 | Littau .............................. 56/329 |
| 4,967,544 | A | | 11/1990 | Ziegler et al. |
| 5,012,631 | A | * | 5/1991 | Hostetler et al. ............... 53/588 |

(Continued)

FOREIGN PATENT DOCUMENTS

FR           2488772 A1     2/1982

OTHER PUBLICATIONS

Co-Owned U.S. Appl. No. 13/918,250, filed Jun. 14, 2013, pp. 23.

(Continued)

*Primary Examiner* — Michael McCullough
*Assistant Examiner* — Lynn Schwenning
(74) *Attorney, Agent, or Firm* — Armstrong Teasdale LLP

(57) ABSTRACT

Apparatus for gathering bales that substantially match conveyor speed to ground speed. Methods for gathering bales that use such apparatus are also provided.

25 Claims, 9 Drawing Sheets

(56) References Cited

U.S. PATENT DOCUMENTS

| | | | |
|---|---|---|---|
| 6,553,312 B2 | 4/2003 | Upadhyaya et al. | |
| 6,587,771 B2 | 7/2003 | Panoushek et al. | |
| 6,647,328 B2 * | 11/2003 | Walker | B60R 25/02 701/2 |
| 6,892,517 B2 * | 5/2005 | Adams | A01D 34/78 56/10.2 R |
| 7,213,389 B2 | 5/2007 | Teijido et al. | |
| 7,386,380 B2 | 6/2008 | Bares et al. | |
| 7,392,124 B2 | 6/2008 | MacGregor et al. | |
| 7,555,882 B2 | 7/2009 | Clauss et al. | |
| 2010/0299029 A1 * | 11/2010 | Fackler | A01D 90/08 701/50 |
| 2011/0318150 A1 * | 12/2011 | Kelderman | A01D 85/005 414/518 |
| 2013/0129458 A1 * | 5/2013 | Cheney et al. | 414/507 |

OTHER PUBLICATIONS

Co-Owned U.S. Appl. No. 13/918,262, filed Jun. 14, 2013, pp. 25.
Co-Owned U.S. Appl. No. 13/918,273, filed Jun. 14, 2013, pp. 24.
Co-Owned U.S. Appl. No. 13/918,286, filed Jun. 14, 2013, pp. 27.
International Search Report, Application No. PCT/NL2013/050464, dated Apr. 2 2014, pp. 3.

* cited by examiner

CONTROL OF CONVEYOR SPEED IN A BALE GATHERING APPARATUS

CROSS-REFERENCE TO RELATED APPLICATION

The present application claims the benefit of U.S. Provisional Application No. 61/665,754 filed Jun. 28, 2012, which is incorporated herein by reference in its entirety.

FIELD OF THE DISCLOSURE

The field of this disclosure relates to apparatus for gathering bales and, in particular, apparatus that substantially match conveyor speed to ground speed. The field of this disclosure also relates to methods for gathering bales that use such apparatus.

BACKGROUND

Crop forages such as hay (e.g., alfalfa and/or grass hay) are periodically cut in the field, dried and compacted into bales for transport and storage of the forage material. Recent evolutions in row crop production and in technology for processing these materials have led to changes in the scale and economics of harvest and to increasing potential for harvest of crop residues like corn stover. Corn stover is also baled in the field and used as livestock feed, bedding or production of biofuels. In addition, harvest technology for cotton has been developed, that includes the step of baling the cotton in the field. Due to these relatively recent changes, the scale at which this type of harvest process is conducted in some instances is different than the traditional process. The density of the bales, in terms of the number of bales per acre, is higher in some instances, the labor availability is less in some instances and the criticality of timing is higher in some instances.

Materials may be baled into relatively large round (round in cross-section) bales which may be tied by twine, netting or plastic wrap depending on the type of material, the type of storage and the intended use of the material. The bales are typically left in the field, near the location where the bale was formed, to minimize labor and time required for the harvest process including the baling operation.

A continuing need exists for an apparatus for gathering and transporting round bales in the field after baling, one that allows the bales to be gathered relatively quickly and reliably and in a way to minimize demands on the operator, and that consistently positions the bales adjacent one another to minimize the area required for storage. A need also exists for methods for gathering bales that use such apparatus.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is related to an apparatus for gathering bales. The apparatus includes a loading assembly for lifting a bale and conveying it toward the rear of the device. The loading assembly includes a first arm having a first conveyor belt and a second arm with a second conveyor belt. A controller adjusts the speed of the first conveyor belt and/or the second conveyor belt such that the speed of the first and/or second conveyor belts is substantially equal to the ground speed of the apparatus.

Another aspect of the present disclosure is directed to a method for gathering bales resting on a surface by use of an apparatus for gathering bales. The apparatus includes a loading assembly for lifting a bale and conveying it toward the rear of the device. The loading assembly includes a first arm comprising a first conveyor belt and a second arm comprising a second conveyor belt. The apparatus is directed toward a bale. The speed of the first conveyor belt and/or the second conveyor belt is controlled while directing the apparatus toward the bale such that the speed of the first and/or second conveyor belts is substantially equal to the ground speed of the apparatus.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
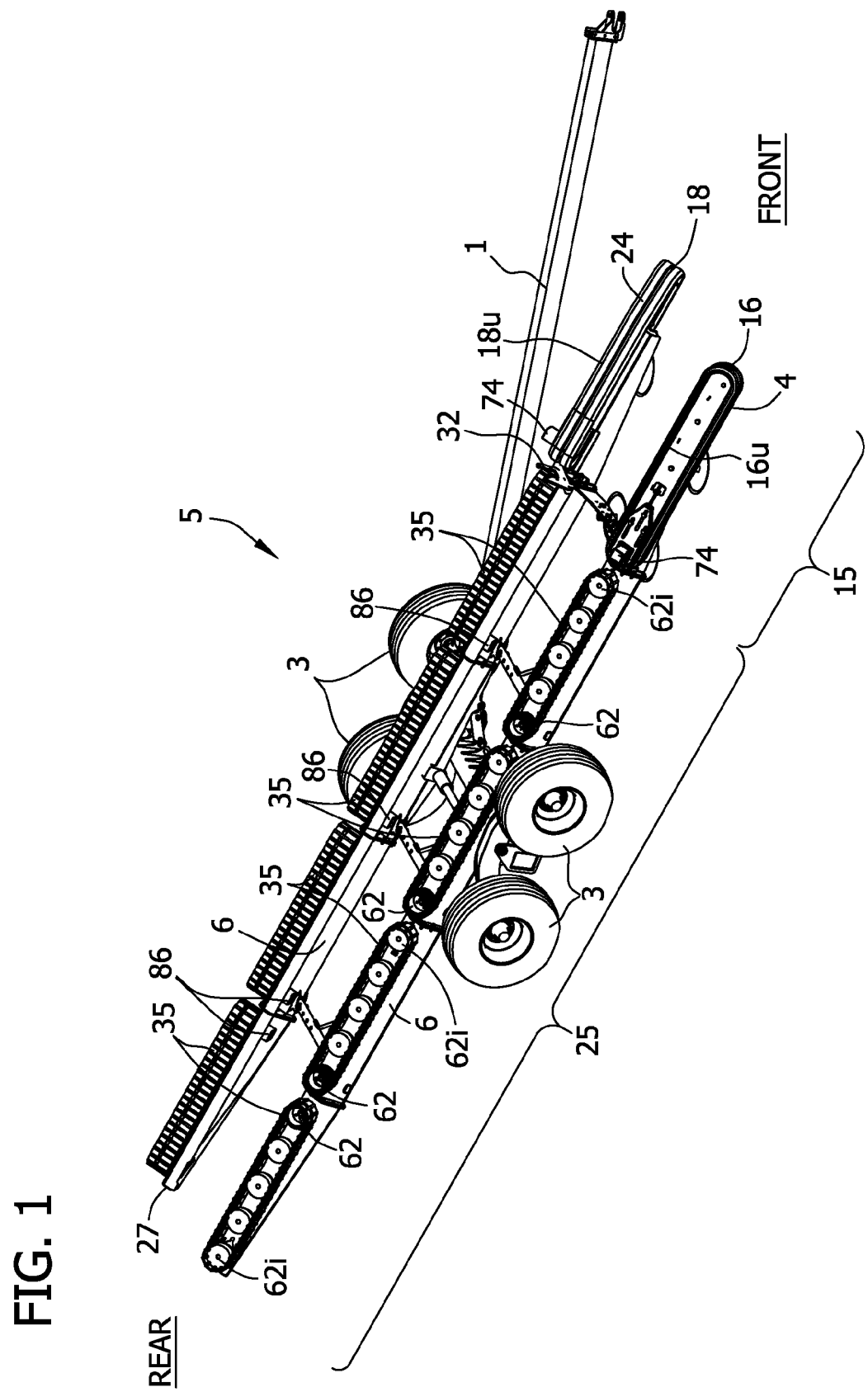
FIG. 1 is a perspective view of an apparatus for gathering bales.
Figure 7:
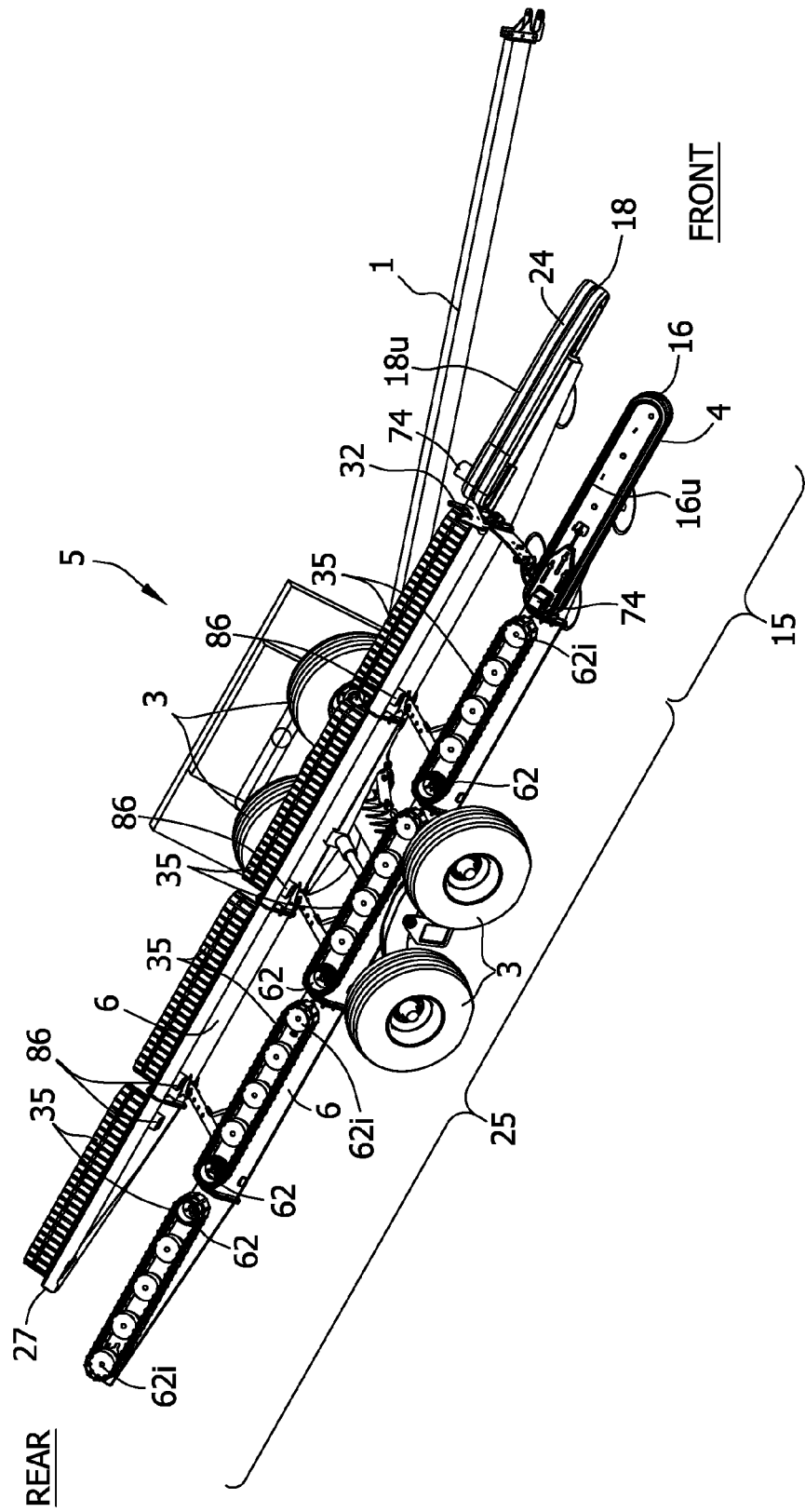
FIG. 7 is a perspective view of another embodiment of an apparatus for gathering bales having a propulsion mechanism.

An embodiment of an apparatus for gathering round bales B is generally referred to as 5 in FIG. 1. The apparatus 5 includes a bed 25 for holding one or more bales and a loading assembly 15 for lifting a bale off the ground and conveying it to the bed. The apparatus 5 includes a tongue 1 for pulling the apparatus by use of for example, a tractor or other pulling vehicle. In some embodiments (not shown) the apparatus 5 includes its own propulsion mechanism 8 (FIG. 7) rather than being pulled by a pulling vehicle.

Generally, the apparatus 5 is suitable for picking up cylindrical bales commonly referred to as "round" bales. Round bales are used for harvesting any material capable of being formed into a cylindrical bale such as traditional hay crops (e.g., alfalfa or grass), corn stover or other crop residues, cotton, or woody products like small diameter trees. The apparatus 5 shown in FIG. 1 is configured for loading up to 5 bales. The apparatus 5 may be modified to carry more or less bales without departing from the scope of the present disclosure.

Figure 5:
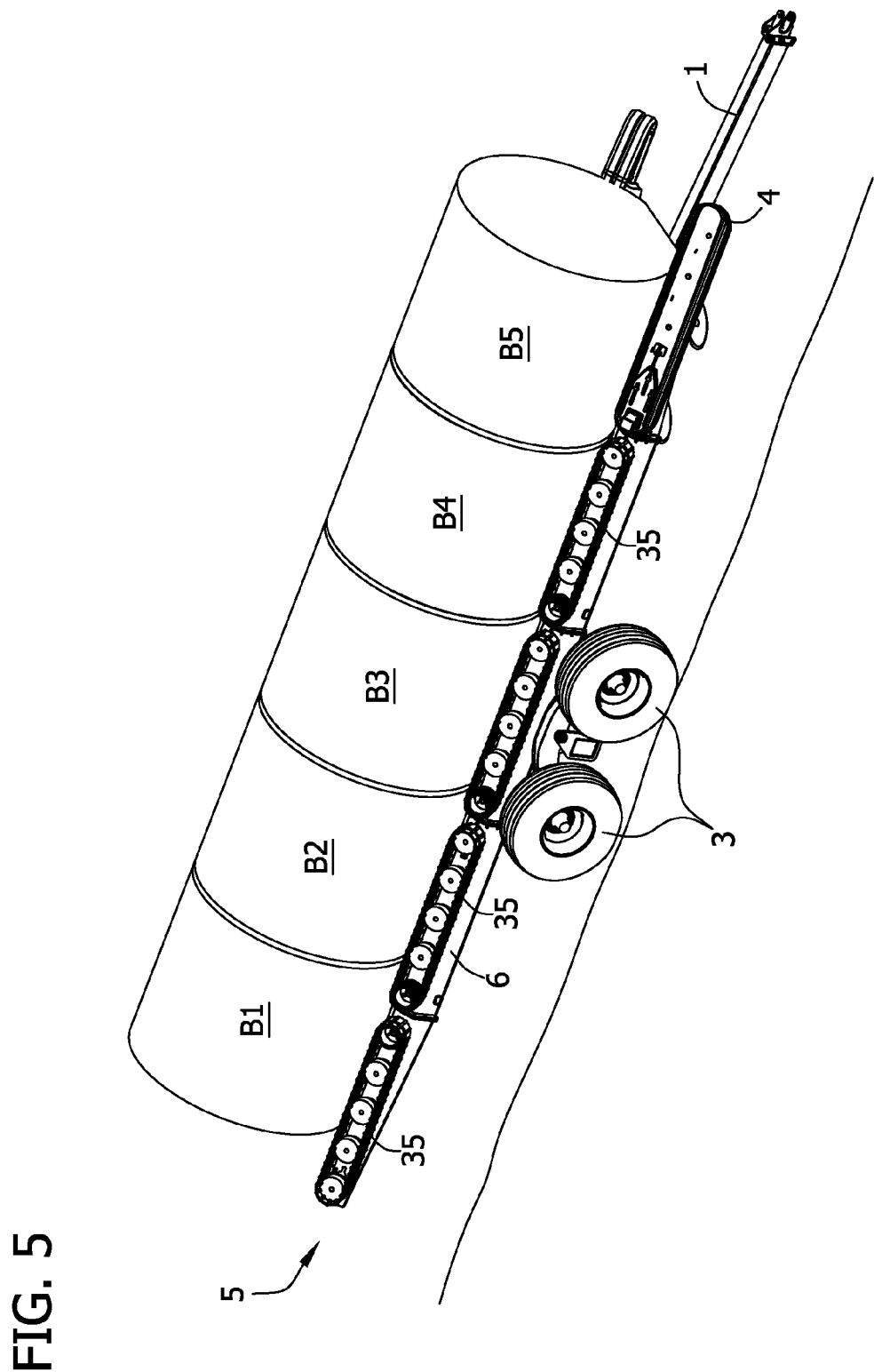
FIG. 5 is a perspective view of the apparatus after being loaded with bales.
Figure 6:
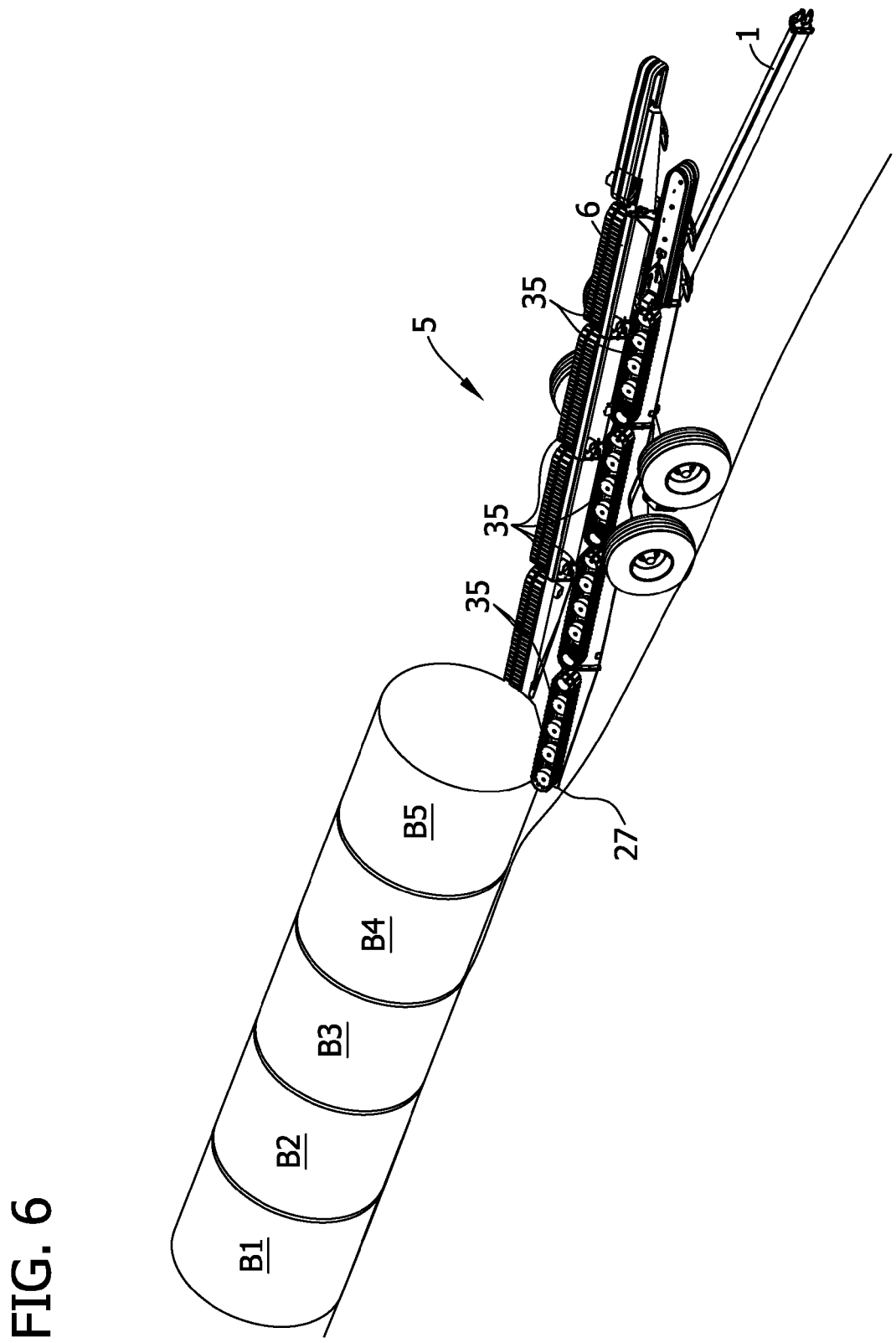
FIG. 6 is a perspective view of the apparatus during unloading of bales.

The apparatus 5 includes wheels 3 attached to a bed chassis 6. The bed 25 tilts between various positions, to a forward tilted position for loading the bales or unloading to the front, to a middle position used after bales have been loaded for transportation of the loaded bales (FIG. 5) and to a rearward tilted position for unloading and re-loading of bales to the rear (FIG. 6). The apparatus 5 may be tilted hydraulically through manual or automatic control by use of a hydraulic cylinder 17 (FIG. 2) or by any other method available to those of skill in the art. Tracks (not shown) may be used as an alternative to the wheels 3.

The loading assembly 15 includes two arms 4, 24 that are the first portion of the apparatus 5 to contact the bale during loading. Each arm 4, 24 includes an endless conveyor belt 16, 18. The endless conveyor belt 16 may move along a path between a front idler roller and driven rear roller connected to a rotary power device 74 such as a hydraulic motor. The arm 4 includes support rollers positioned between the front idler roller and the drive roller.

Figure 3:
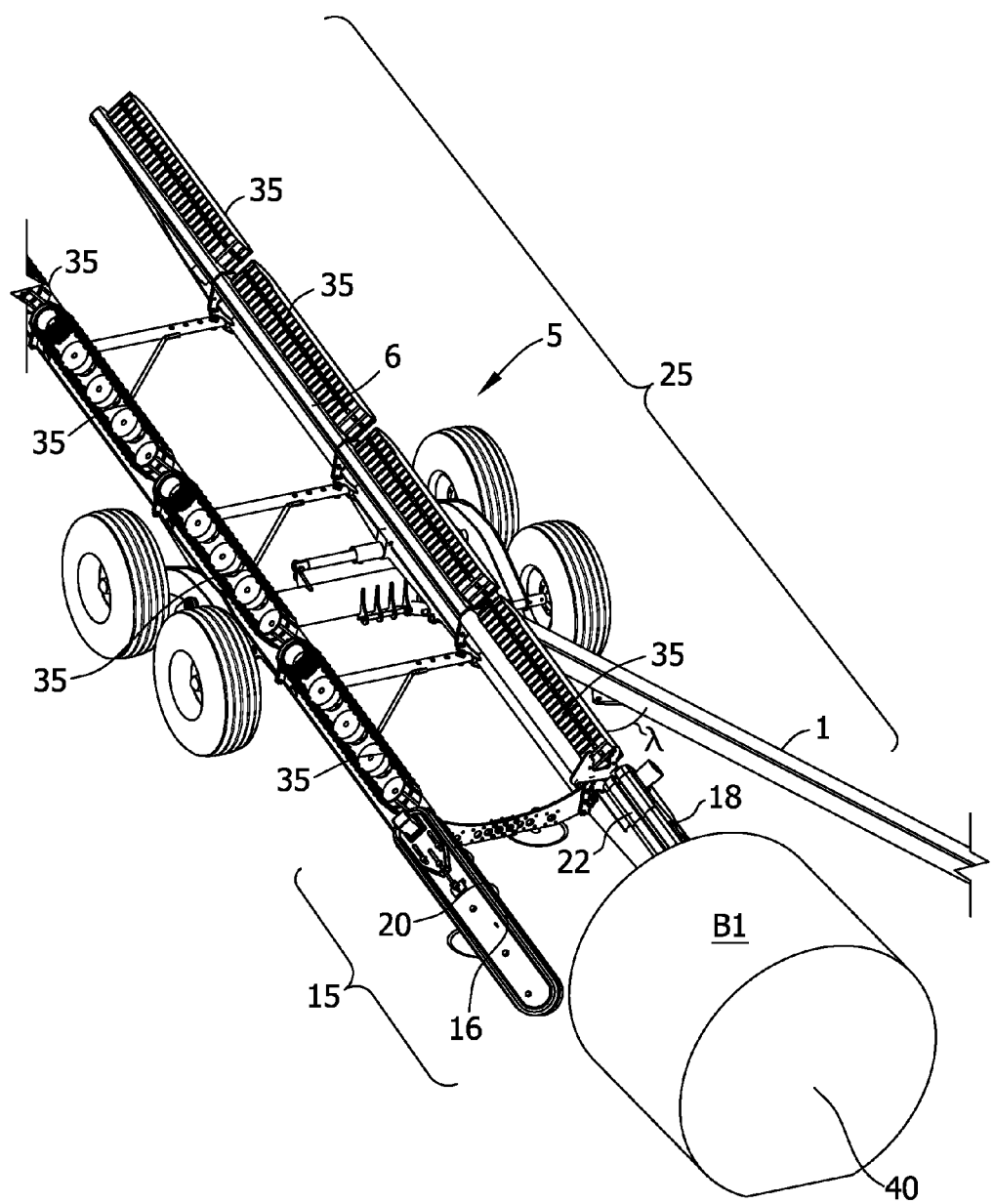
FIG. 3 is a perspective view of the apparatus prior to loading a round bale.

Each belt 16, 18 includes upper portions 16*u*, 18*u* (FIG. 1) that are capable of carrying the weight of a bale. The movement of the belt has been found to be effective to lift a bale off the ground and for simultaneously causing the bale to move toward the bed 25. This lifting and transporting action occurs after the two conveyor belts contact the bale B1 (FIG. 3).

Referring again to FIG. 1, the bed 25 includes a number of bed conveyors 35, each having an endless belt routed around a front idler roller and a rear powered roller that may be rotated to cause the belt to move which results in moving bales away from the loading assembly and toward the end 27 of the bed. Each conveyor 35 may have an effective length, the distance between the idler roller and the drive roller. This effective length may be the length of about one bale. Typical bale lengths for forage products may be between about 40 and 60 inches and bales of cotton are in the range of 100 inches in length. It should be noted that the apparatus 5 and the effective length of the conveyor belts 16, 18 are not limited by bale size or to a particular length.

Alternatively, the bed 25 may have one bed conveyor 35 on each side that extends from the first end 32 to the second end 27 rather than a series of bed conveyors on each side. In some embodiments, the bed 25 has a single conveyor belt (not shown) that forms a floor of the bed upon which the bales rest for moving bales toward the second end 27.

The conveyor belts 16, 18 of the first and second arms 4, 24 of the loading assembly 15 and the conveyor belts 35 of the bed 25 may be driven by hydraulics, as discussed above, or alternately by any type of rotary power device 86 such as an electric motor. The position of the loading assembly 15 and bed 25 relative to the pull vehicle (i.e., whether the apparatus is pulled directly behind the pull vehicle or at an offset position such as when bales are being gathered from the field) may be adjusted by manipulating the angle between the tongue 1 and the bed chassis 6 (FIG. 3) by use of hydraulics or by any other suitable method.

The bed conveyors may be constructed from the same basic components used in the loading assembly conveyors, with an endless conveyor belt, an idler roller, a drive roller and supports. The embodiments illustrated herein show an alternative construction for the bed conveyors 35, each including an endless conveyor belt of a slightly different construction than the belts 16 and 18, routed around a drive pulley 62 and an idler pulley 62*i*. In some embodiments the drive pulley 62 is positioned at the front or, in other embodiments, at the rear.

It should be noted that any suitable type of conveyer belts or conveyor systems may be included in the apparatus. For instance, a conveyor belt composed of a carcass of nylon or fiberglass fibers covered by a wide variety of materials including rubber, PVC, thermoplastic polymer or the equivalent may be used. Chain conveyor systems may also be used without departing from the scope of the present disclosure. In this regard, "conveyor belt" as used herein includes any arrangement in which a belt, chain, track or the like is moved around a series of pulleys to cause movement of the belt, chain or track.

In operation, the apparatus 5 is pulled by the pull vehicle (not shown) toward a bale as shown in FIG. 3. The vehicle may provide the power for running the various conveyors and positioning systems (e.g., by use of hydraulics) or the apparatus 5 may include its own independent power system (e.g., hydraulic system). The apparatus 5 may be described herein with reference to a hydraulic system. It should be noted that the present disclosure should not be limited to a hydraulic system as the principles would apply to other power transfer technologies such as an electrical system.

As shown in FIG. 3, the bale B1 should be oriented such that the ends 40 of the cylindrical bale are perpendicular to the apparatus 5 as the apparatus 5 approaches the bale B1. The chassis 6 and tongue 1 are caused to be at an angle $\lambda$ (FIG. 3) relative to one another such that the loading assembly 15 and bed 25 travel outside of the path of the pull vehicle (not shown) to allow the pull vehicle to travel "outside of" or parallel to the bales B targeted for loading.

The first and second conveyor belts 16, 18 are driven or actuated to cause the belt to move while the apparatus 5 travels toward the first bale B1. As the apparatus 5 approaches the bale B1, the conveyor belts 16, 18 of the arms 4, 24 contact the first bale causing the bale to be lifted and simultaneously moved toward the bed 25. The first bale B1 may be loaded onto the loading assembly 15 without stopping the apparatus 5 such that the apparatus 5 and the vehicle that pulls the apparatus may continually move forward during bale pick-up.

Figure 4:
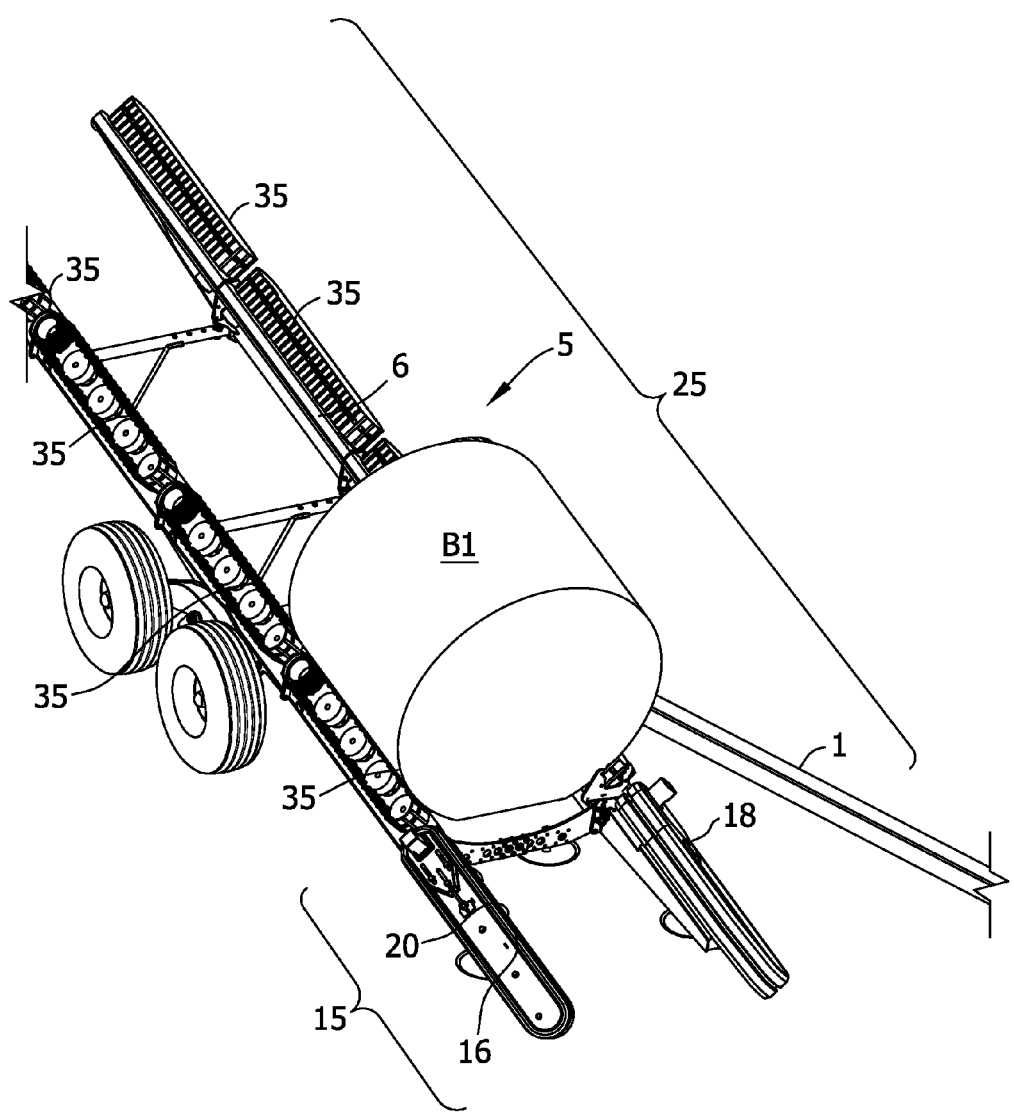
FIG. 4 is a perspective view of the apparatus after the round bale has been loaded onto the bed.

Once the bale B1 is loaded on the loading assembly 15, belt conveyors 35 (e.g., the set of conveyors nearest the loading assembly for the embodiment illustrated in FIG. 1) move to transfer the bale B1 from the loading assembly 15 to the position on the bed 25 as illustrated in FIG. 4. Once loaded onto the bed 25, the bed conveyors 35 are stopped to position the first bale B1 adjacent the end of the loading assembly.

In accordance with the present disclosure, each bale subsequent to the first bale B1 may be loaded until it nears or contacts the previously loaded bale which causes the bale to stop. Once the first bale B1 is loaded, the apparatus 5 is directed to a second bale B2. The conveyor belts 16, 18 of the arms 4, 24 are in motion and contact the second bale B2 to cause the bale to move toward the bed 25 and toward the first bale B1. The loading assembly 15 grasps the second bale B2 and carries the second bale B2 toward the bed 25 until it nears or contacts the first bale B1. Once the second bale B2 nears or contacts the first bale B1, one or more sets of bed conveyors 35 are then actuated to move the first and second bales B1, B2 partially down the bed 25 toward the second end 27. This process is repeated to load additional bales.

The speed of conveyor belts 16, 18 relative to the frame may be controlled to be approximately equal to the ground speed of the apparatus 5. The conveyor belts move in a direction so that the upper surface of the belt moves from front-to-back. Thus, as the apparatus is being pulled forward, there is approximately no relative speed difference between the conveyors 16, 18 and the ground or the bale.

In one embodiment, a direct gear drive system 39 (FIG. 2) is used to match the speed of the conveyor belts 16, 18 to the ground speed of the apparatus 5 through mechanical elements to ensure speed matching of the travel speed and pickup device. The apparatus wheels 3 are driven by the ground as the apparatus 5 moves forward. This drive is transmitted though gears, driveshafts, and gearboxes to drive the pickup conveyors at a proportional speed to the forward travel speed.

Figure 8:
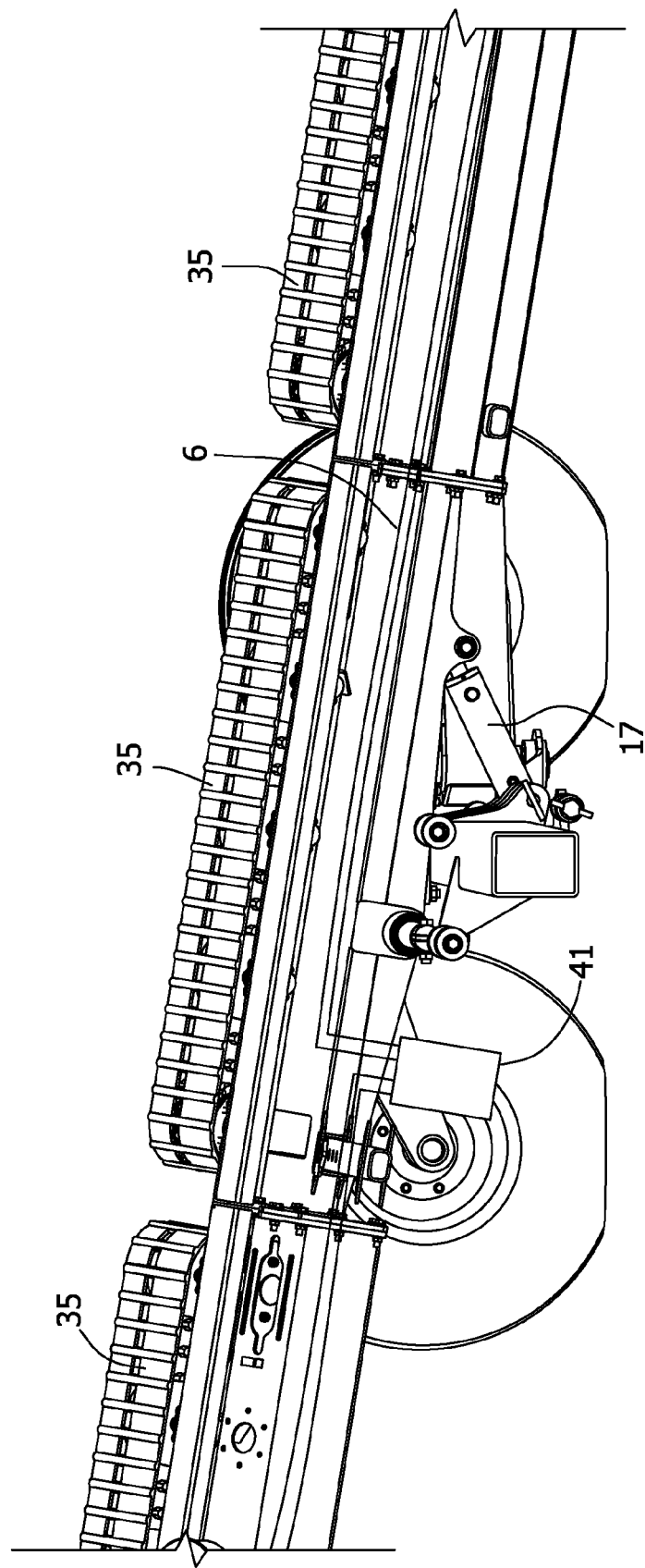
FIG. 8 is a perspective view of a portion of another embodiment of the apparatus showing a hydraulic valve to meter hydraulic fluid flow.

In another embodiment, a hydraulic orbital valve device 41 (FIG. 8) is attached to the trailer wheels to meter hydraulic fluid flow to the conveyors 16, 18.

Figure 9:
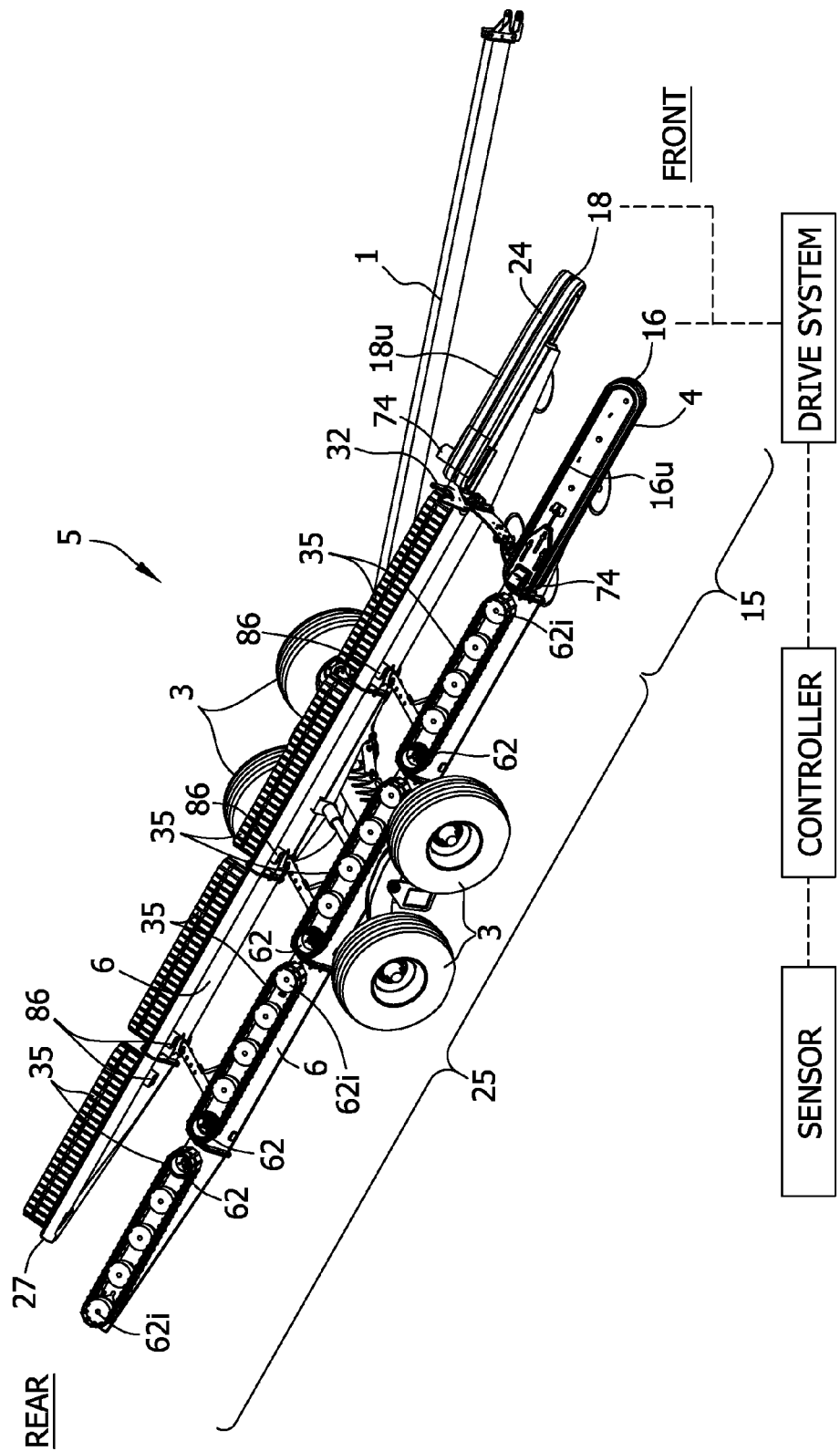
FIG. 9 is a perspective view of the apparatus with a drive system, controller and sensor shown schematically.

In another embodiment and as shown in FIG. 9, one or more speed sensors (electric, electronic, magnetic, radar or inductance sensors) are included on the wheel or the pulling vehicle to detect forward speed and the apparatus 5 includes a controller to control the speed of the conveyors 16, 18.

In another embodiment, the speed sensor measures the revolution rate of the wheels and sends a single via a controller to a hydraulic or electrical motor that powers the conveyors 16, 18 to match the ground speed.

In yet another embodiment, the speed sensor is a GPS device that uses GPS signals to determine ground speed. A signal is sent by a controller to a hydraulic or electrical motor that powers the conveyors 16, 18 to match the ground speed.

In a further embodiment, a bale sensor (e.g., acoustic sensor, laser or camera) senses the bale location relative to the apparatus to provide input to the conveyors by a controller. The bale sensor may also provide input to the controller. The speed of each conveyor belt 16, 18 may be independently controlled such that the input (e.g., ground speed and relative position of the bale) may be used to automatically align misaligned bales.

The surface characteristics of the conveyors 16, 18 may affect the frictional engagement between the conveyor belt and the bale. The conveyor belts 16, 18 may include a surface that will adequately engage the bale to enhance the capability for the loading assembly to reliably lift the bales while also minimizing potential for damage to the bale and any bale wrapping.

Bales are loaded onto the apparatus 5 until the apparatus becomes fully loaded. Once fully loaded, the apparatus 5 may be adjusted to promote ease of travel to the unloading site. As shown in FIG. 5, the bed chassis 6 of the apparatus 5 may be leveled by use of hydraulic cylinder 17 (FIG. 2) and the tongue 1 and the relative position between tongue 1 and the bed 15 may be adjusted (e.g., the tongue may be adjusted to be more parallel to the bed).

Figure 2:
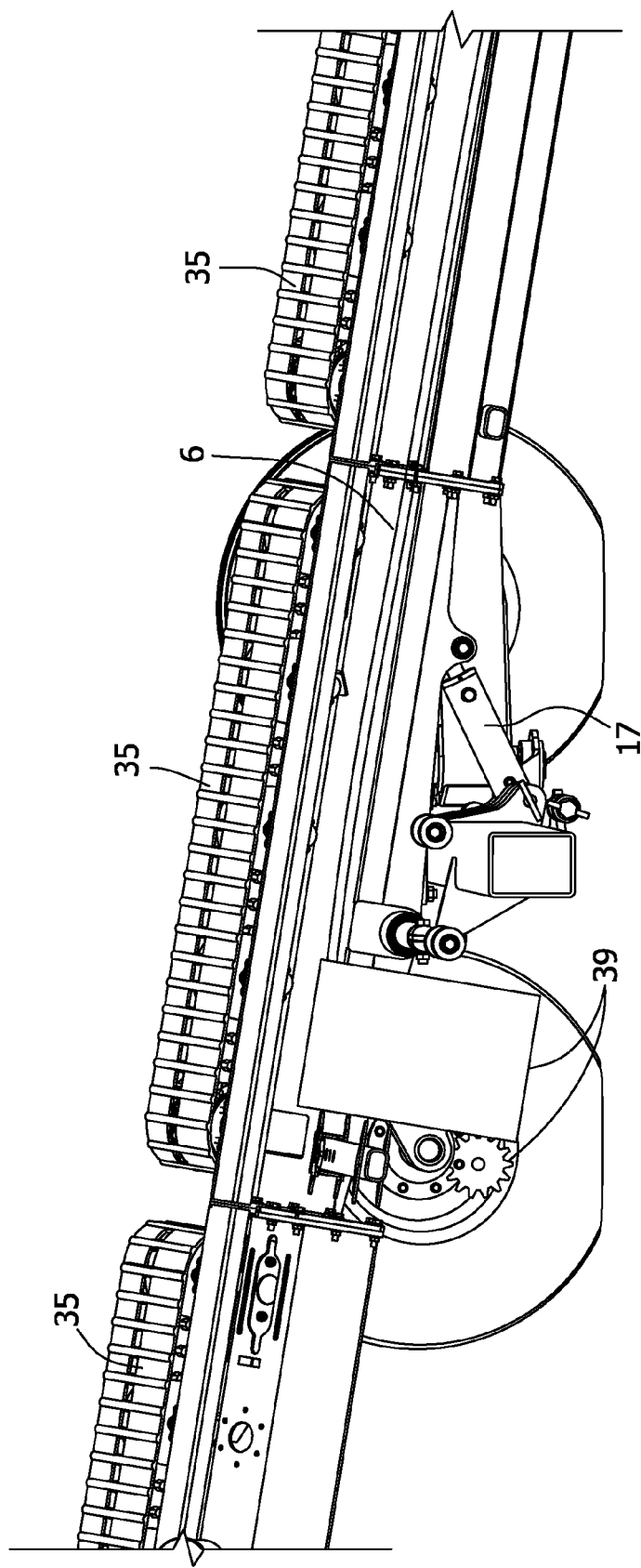
FIG. 2 is a perspective view of a portion of the apparatus showing a hydraulic cylinder for tilting the chassis of the apparatus.

As shown in FIG. 6, once the apparatus 5 is pulled to the desired unloading site for the bales, the bed chassis 6 is tilted by use of the hydraulic cylinder 17 (FIG. 2). The bed conveyors 35 are operated and the apparatus 5 is caused to move forward while the bales are unloaded.

Compared to conventional apparatus for gathering bales, the apparatus 5 described above has several advantages. By controlling the speed of the conveyor belts 16, 18 to match the ground speed of the apparatus 5, bales may be picked up consistently with minimal damage. In embodiments in which a sensor is used to determine the position of a bale, the conveyors may be independently controlled to automatically align misaligned bales.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing [s] shall be interpreted as illustrative and not in a limiting sense.

What is claimed is:

1. An apparatus for gathering bales resting on a surface, the apparatus comprising:
    ground-engaging wheels or tracks for moving the apparatus relative to the surface at a ground speed;
    a bed for holding one or more bales and having a first side and a second side opposite the first side, the bed comprising a conveyor belt toward the first side of the bed and a conveyor belt toward the second side, the bed not having more than two conveyor belts opposite each other;
    a loading assembly for grasping and lifting a bale and conveying it to the bed and comprising a first arm comprising a first conveyor belt and a second arm comprising a second conveyor belt, the loading assembly not comprising more than two conveyor belts; and
    a drive system coupled to the ground-engaging wheels or tracks for controlling and varying a speed of the first and second conveyor belts of the loading assembly to match the ground speed of the apparatus, the drive system not varying the speed of the first and second conveyor belts from a pulling vehicle.

2. The apparatus as set forth in claim 1 wherein the drive system is a direct gear drive system coupled to the ground-engaging wheels or tracks.

3. The apparatus as set forth in claim 1 wherein the apparatus further comprises a propulsion mechanism.

4. The apparatus as set forth in claim 1 wherein the apparatus further comprises a propulsion mechanism, the propulsion mechanism not being a separate pulling vehicle.

5. The apparatus as set forth in claim 1 comprising a controller connected to a speed sensor that measures a revolution rate of the wheels.

6. The apparatus as set forth in claim 1 wherein the apparatus consists essentially of:
    the ground-engaging wheels or tracks;
    the loading assembly;
    the drive system; and
    the bed.

7. The apparatus as set forth in claim 1 wherein the drive system is not powered from a pulling vehicle.

8. The apparatus as set forth in claim 1 wherein the drive system consists essentially of components that control and vary the speed of the first and second conveyor belts from the apparatus and not from a separate pulling vehicle.

9. The apparatus as set forth in claim 8 further comprising a pull vehicle.

10. The apparatus as set forth in claim 1 wherein the hydraulic device consists essentially of components that control and vary the speed of the first and second conveyor belts from the apparatus and not from a separate pulling vehicle.

11. The apparatus as set forth in claim 10 further comprising a pull vehicle.

12. An apparatus for gathering bales resting on a surface, the apparatus comprising:
   ground-engaging wheels or tracks for moving the apparatus relative to the surface at a ground speed;
   a bed for holding one or more bales and having a first side and a second side opposite the first side, the bed comprising a conveyor belt toward the first side of the bed and a conveyor belt toward the second side, the bed not having more than two conveyor belts opposite each other;
   a loading assembly for grasping and lifting a bale and conveying it to the bed, the loading assembly being separate from the bed and comprising a first arm comprising a first conveyor belt and a second arm comprising a second conveyor belt, the loading assembly not comprising more than two conveyor belts; and
   a hydraulic device coupled to the ground-engaging wheels or tracks for controlling and varying a speed of the first and second conveyor belts of the loading assembly to match the ground speed of the apparatus, the hydraulic device not varying the speed of the first and second conveyor belts from a pulling vehicle.

13. The apparatus as set forth in claim 12 wherein the hydraulic device is a hydraulic valve device.

14. The apparatus as set forth in claim 13 wherein the hydraulic valve device is an orbital valve.

15. The apparatus as set forth in claim 12 wherein the apparatus further comprises a propulsion mechanism.

16. The apparatus as set forth in claim 12 wherein the apparatus further comprises a propulsion mechanism, the propulsion mechanism not being a separate pulling vehicle.

17. The apparatus as set forth in claim 12 comprising a hydraulic motor for powering the first conveyor belt or the second conveyor belt while the apparatus approaches a bale.

18. The apparatus as set forth in claim 12 comprising a controller connected to a speed sensor that measures a revolution rate of the wheels.

19. The apparatus as set forth in claim 12 wherein the apparatus consists essentially of:
   the ground-engaging wheels or tracks;
   the loading assembly;
   the hydraulic device; and
   the bed.

20. The apparatus as set forth in claim 12 wherein the drive system is not powered from a pulling vehicle.

21. A method for gathering bales resting on a surface by use of an apparatus for gathering bales, the apparatus comprising ground-engaging wheels or tracks, a bed for holding one or more bales, a loading assembly for lifting a bale and conveying it toward the bed, the loading assembly comprising a first arm comprising a first conveyor belt and a second arm comprising a second conveyor belt, and a drive system or hydraulic device coupled to the ground-engaging wheels or tracks for controlling and varying a speed of the first and second conveyor belts of the loading assembly to match the ground speed of the apparatus, the method comprising:
   propelling the apparatus over the surface on which the bales rest and toward a bale at a ground speed;
   actuating the first conveyor belt and the second conveyor belt while directing the apparatus toward the bale wherein the apparatus controls and varies a speed of the first and second conveyor belts to be substantially equal to the ground speed of the apparatus without input from an operator;
   loading a bale onto the first and second conveyor belts of the loading assembly; and
   conveying the bale from the loading assembly to the bed.

22. An apparatus for gathering bales resting on a surface, the apparatus comprising:
   ground-engaging wheels or tracks for moving the apparatus relative to the surface at a ground speed;
   a bed having a first side and a second side opposite the first side, the bed comprising a conveyor belt toward the first side of the bed and a conveyor belt toward the second side, the bed not having more than two conveyor belts opposite each other;
   a loading assembly for grasping and lifting a bale and conveying it to the bed, the loading assembly being separate from the bed and comprising a first arm comprising a first conveyor belt and a second arm comprising a second conveyor belt, the loading assembly not comprising more than two conveyor belts;
   a drive system for controlling a speed of the first and second conveyor belts of the loading assembly to match the ground speed of the apparatus;
   a controller for adjusting a speed of the first conveyor belt and the second conveyor belt such that the speed of the first and/or second conveyor belts is substantially equal to the ground speed of the apparatus; and
   a speed sensor to detect the speed of the apparatus, the speed sensor being coupled to the controller to send a signal to the controller.

23. The apparatus as set forth in claim 22 wherein the speed sensor is mounted on a wheel to detect the speed and/or the rate of revolution of a wheel.

24. The apparatus as set forth in claim 22 wherein the sensor is a GPS device.

25. The apparatus as set forth in claim 22 wherein the controller is not part of a pulling vehicle.

* * * * *